United States Patent
Heppel (10) Patent No.: US 12,172,622 B2
(45) Date of Patent: Dec. 24, 2024

(54) METHOD FOR OPERATING AN AUTOMATIC TRANSMISSION OF A HYBRID VEHICLE, AUTOMATIC TRANSMISSION AND HYBRID VEHICLE

(71) Applicant: Bayerische Motoren Werke Aktiengesellschaft, Munich (DE)

(72) Inventor: Stefan Heppel, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 18/682,691

(22) PCT Filed: Sep. 27, 2022

(86) PCT No.: PCT/EP2022/076845
§ 371 (c)(1),
(2) Date: Feb. 9, 2024

(87) PCT Pub. No.: WO2023/072511
PCT Pub. Date: May 4, 2023

(65) Prior Publication Data
US 2024/0359678 A1    Oct. 31, 2024

(30) Foreign Application Priority Data
Oct. 26, 2021 (DE) .................. 10 2021 127 825.2

(51) Int. Cl.
*B60W 10/10* (2012.01)
*B60W 10/06* (2006.01)
*B60W 20/30* (2016.01)

(52) U.S. Cl.
CPC ........... *B60W 10/06* (2013.01); *B60W 10/10* (2013.01); *B60W 20/30* (2013.01);
(Continued)

(58) Field of Classification Search
CPC ...... B60W 10/06; B60W 10/08; B60W 10/10; B60W 2510/083; B60W 20/30;
(Continued)

(56) References Cited

U.S. PATENT DOCUMENTS

| 2001/0039230 A1 | 11/2001 | Severinsky et al. |
| 2012/0130579 A1 | 5/2012 | Steuernagel et al. |

(Continued)

FOREIGN PATENT DOCUMENTS

| DE | 10 2008 043 945 A1 | 5/2010 |
| DE | 10 2012 004 200 A1 | 9/2012 |

(Continued)

OTHER PUBLICATIONS

English translation of DE102012004200A1; http://translationportal.epo.org; Aug. 26, 2024 (Year: 2024).*

(Continued)

*Primary Examiner* — Roger L Pang
(74) *Attorney, Agent, or Firm* — Crowell & Moring LLP (57) ABSTRACT

A method for operating an automatic transmission of a hybrid vehicle which has an electric traction machine and an internal combustion engine. A drag torque is provided at the electric traction machine. On the basis of a maximally available electric power for driving the electric traction machine, a characteristic map having respective curves for respective gears of the automatic transmission of the hybrid vehicle is created. The characteristic map is adjusted according to the drag torque to be provided by each curve being reduced by the drag torque to be provided. A shifting logic is specified in which respective shifting points for shifting the automatic transmission are defined at intersections of the curves of adjacent gears of the adjusted characteristic map, wherein the automatic transmission is shifted on the basis of the shifting logic in the respective shifting points.

12 Claims, 4 Drawing Sheets

(52) U.S. Cl.
CPC ............... *B60W 2510/0676* (2013.01); *B60W 2510/0685* (2013.01); *B60W 2510/083* (2013.01); *B60W 2510/104* (2013.01); *B60W 2710/06* (2013.01); *B60W 2710/1005* (2013.01)

(58) Field of Classification Search
CPC ........... B60W 20/10; B60W 2510/104; B60W 2510/0676; B60W 2510/0685; B60W 2710/06; B60W 2710/1005
USPC .................................... 701/54, 55, 56; 477/5
See application file for complete search history.

(56) References Cited

U.S. PATENT DOCUMENTS

| | | | | |
|---|---|---|---|---|
| 2013/0124026 A1* | 5/2013 | Ueno | .................... | B60W 10/26 180/65.265 |
| 2015/0134173 A1* | 5/2015 | Choi | .................... | B60W 10/06 180/65.265 |
| 2018/0354497 A1* | 12/2018 | Lee | ........................ | B60W 10/11 |
| 2019/0359050 A1 | 11/2019 | Komuro | | |
| 2021/0253084 A1* | 8/2021 | Kwon | ...................... | B60K 6/48 |

FOREIGN PATENT DOCUMENTS

| | | |
|---|---|---|
| EP | 2 443 011 B1 | 1/2013 |
| EP | 2 752 345 A1 | 7/2014 |
| WO | WO 2012/010952 A2 | 1/2012 |

OTHER PUBLICATIONS

International Search Report (PCT/ISA/210) issued in PCT Application No. PCT/EP2022/076845 dated Dec. 15, 2022 with English translation (4 pages).

German-language Written Opinion (PCT/ISA/237) issued in PCT Application No. PCT/EP2022/076845 dated Dec. 15, 2022 with partial English translation (9 pages).

German-language German Office Action issued in German Application No. 10 2021 127 825.2 dated Aug. 11, 2022 with partial English translation (12 pages).

* cited by examiner

METHOD FOR OPERATING AN AUTOMATIC TRANSMISSION OF A HYBRID VEHICLE, AUTOMATIC TRANSMISSION AND HYBRID VEHICLE

BACKGROUND AND SUMMARY

This disclosure relates to a method for operating an automatic transmission of a hybrid vehicle, to an automatic transmission for a hybrid vehicle, and to a hybrid vehicle.

EP 2 443 011 B1 discloses a parallel hybrid vehicle, in the case of which an electric motor is arranged on a shaft of an internal combustion engine, the electric motor being connected via a clutch to the internal combustion engine. If the hybrid vehicle is driven solely by the electric motor, the power output of the hybrid vehicle is limited by a maximum drive torque of the electric motor. If this maximum drive torque is no longer sufficient to comply with the driver's request for further acceleration of the hybrid vehicle, the clutch is closed, the electric motor cranking over the internal combustion engine and in the process starting the latter. From this time, both the electric motor and the internal combustion engine contribute to the drive of the hybrid vehicle. During the combustion engine start phase, the electric motor has to apply the drag torque for the internal combustion engine in addition to the vehicle drive torque. It can occur in the process that the electric motor cannot provide sufficient torque for simultaneous driving of the hybrid vehicle and for the provision of the drag torque, for example, because an available adjustable drive torque drops as a rotational speed of the electric motor rises. In this case, a vehicle acceleration can collapse, with an uncomfortable jerk which can be perceived by the driver.

It is therefore an object of the present disclosure to provide a solution which enables cranking over, which is particularly gentle for a vehicle occupant, of an internal combustion engine for an electric traction machine, and shifting, which is particularly gentle for vehicle occupants, of an automatic transmission.

The disclosure relates to a method for operating an automatic transmission of a hybrid vehicle. This hybrid vehicle has an electric traction machine and an internal combustion engine. The electric traction machine is configured to provide traction power for the hybrid vehicle, as a result of which the hybrid vehicle can be driven with electrical energy. Furthermore, the electric traction machine is configured to crank over the internal combustion engine. In particular, the hybrid vehicle is configured as what is known as a parallel hybrid. In the case of a parallel hybrid, a mechanical connection can be provided between the internal combustion engine and at least one wheel of the hybrid vehicle, in particular via a transmission. Therefore, the hybrid vehicle can be operated purely electrically, purely by internal combustion engine, or in a mixed form with the two drives at the same time.

It is provided in the case of the method that a drag torque which is required for potential cranking over of the internal combustion engine is provided at the electric traction machine. The drag torque to be provided can be stipulated, in particular, by an electronic computing device, for example, comprising a processor or CPU, and software or firmware stored in a memory or RAM, including for execution of the logic described herein. Therefore, this drag torque to be provided and correspondingly the associated cranking-over power output depending on the transmission input speed are not available for driving the hybrid vehicle. This drag torque which is to be provided at the electric traction machine is therefore a power reserve which is provided to ensure that the internal combustion engine can be cranked over by way of the electric traction machine if the internal combustion engine is to be started. Furthermore, it is provided in the case of the method that, starting from a maximum available electrical power output for driving the electric traction machine, a characteristic diagram for the electric traction machine is produced with respective curves for respective gears of the automatic transmission of the hybrid vehicle, a torque being plotted against a rotational speed in the curves. This torque is the torque which can be provided as a maximum by the electric traction machine for the respective gear of the automatic transmission.

Furthermore, it is provided in the case of the method that the characteristic diagram is adapted in a manner which is dependent on the drag torque to be provided, by each curve being reduced by the drag torque to be provided. For this purpose, the characteristic diagram can be adapted via the electronic computing device. Therefore, a shift of all the curves of the characteristic diagram by the predefined drag torque to be provided takes place downward along the ordinate, on which the torque is plotted. Furthermore, it is provided in the case of the method that a shifting logic is predefined, in which respective shift points for shifting the transmission are defined at points of intersection of the curves of adjacent gears of the adapted characteristic diagram, the automatic transmission being shifted at the respective shift points using the shifting logic. This shifting logic can be stipulated and/or executed by the electronic computing device. Since both the drag torque to be provided and the maximum available electric power output for driving the electric traction machine can change during a journey of the hybrid vehicle, it can be provided that the characteristic diagram is adapted multiple times, in particular at regular intervals and therefore in a repeated manner. In particular, it can be provided that a wheel torque of at least one wheel of the hybrid vehicle is plotted against a transmission output speed of the automatic transmission for the different gears of the automatic transmission in the characteristic diagram for the respective power output which is available for the electric traction machine. In the case of the adaptation of the characteristic diagram, a parallel shift of the respective curves downward by the drag torque to be provided can take place. As a consequence, the characteristic diagram is produced in a manner which is dependent on the available power output, and is adapted in a manner which is dependent on the drag torque to be provided, the drag torque being subtracted at each point from each curve for the adaptation of the characteristic diagram. Since the cranking-over power output to be provided is dependent both on the drag torque to be provided and on the transmission input speed, the cranking-over power output to be provided increases in a linear manner as the transmission input speed rises.

A starting device can be dispensed with as a result of the provision of the drag torque at the electric traction machine. This starting device can be a starter generator or a starter. On account of the provided drag torque, the electric traction machine is ready at any time to crank over the internal combustion engine. The automatic transmission can be shifted in a particularly low-jolt and therefore particularly smooth manner via the adaptation of the characteristic diagram and the shifting of the automatic transmission using the shifting logic, in which the respective shift points for shifting the automatic transmission are fixed at points of intersection of the curves of adjacent gears of the adapted characteristic diagram. As a result, a best possible acceleration profile of the hybrid vehicle can be achieved. Shifting the automatic transmission using the shifting logic makes shifting which is neutral in terms of traction force possible.

The method makes it possible to produce shifting characteristic curves for electric driving of the hybrid vehicle. An available power output for the electric traction machine can vary greatly on account of a charging state and the degradation of a battery of the hybrid motor vehicle which provides electrical energy for the electric traction machine. A likewise great influence factor on respective shifting characteristic curves is a power output provision for cranking-over starting of the internal combustion engine, on account of an omission of the starting device for the internal combustion engine. The method makes it possible that a gear selection can always be adapted to a currently available power output, and therefore a maximum performance of the hybrid vehicle can be delivered. In contrast to the starting device, for example, in the form of a pinion starter, the internal combustion engine is started merely via the transmission of the hybrid vehicle. For this purpose, a separating clutch between the internal combustion engine and the transmission can be closed, and therefore the internal combustion engine can be cranked over. The drag torque can be dependent on different factors, such as a cut-off position of the internal combustion engine, or a temperature of the internal combustion engine. The necessary power output for cranking-over starting of the internal combustion engine rises in a linear manner with the rotational speed of the electric traction machine, since the power output results from the product of torque and rotational speed. At a high rotational speed of the electric traction machine, a high power output is therefore to be provided for cranking-over starting of the internal combustion engine, which high power output is then no longer available for a driver request.

Acceleration potentials of the individual gears of the automatic transmission no longer overlap on account of the cranking-over starting provision. This can lead to there being merely a defined shift point for an optimum-performance acceleration instead of a range for a shift which is neutral in terms of traction force. In the case of the method, an optimum shift point is calculated for each individual gear in a manner which is dependent on the power output which is available for the electric traction machine, a limit torque of the electric machine, and the drag torque to be provided. In order to avoid gear hunting, a validity range of the individual gears is to be adapted continuously to this power-optimum shift point for a stable gear selection.

It is provided in one possible development of the disclosure that the maximum available power output for the electric traction machine is determined in a manner which is dependent on an available power output which is provided by way of the battery of the hybrid vehicle. Therefore, the level of the power output which is provided by the battery for the electric traction machine can be determined on the basis of at least one property of this battery. Starting from this power output which is provided by the battery for the electric traction machine, the maximum available power output for the electric traction machine can in turn be determined. Starting from this determined maximum available power output for the electric traction machine, the starting characteristic diagram which is to be adapted is in turn provided. The power output which is available for the electric traction machine can be determined with particularly great precision by way of the determination of the maximum available power output for the electric traction machine in a manner which is dependent on the available power output which is provided by the battery.

In this context, it can be provided in a further possible refinement of the disclosure that the available power output which is provided by the battery is determined in a manner which is dependent on a charging state of the battery, and therefore in a manner which is dependent on what is known as a state of charge, and/or in a manner which is dependent on a temperature of the battery. Both the charging state and the temperature of the battery have an influence on the available power output which is provided by the battery. In this way, the electrical power output which is provided for the electric traction machine can be determined particularly accurately by way of using the charging state and/or the temperature of the battery.

As a consequence, the characteristic diagram can be produced with particularly great precision, as a result of which shifting which is particularly neutral in terms of traction force can take place during shifting of the automatic transmission at the respective shift points. As an alternative, or in addition, the available power output which is provided by the battery can be dependent on a wiring protection and/or a peak power output of the battery, with the result that the available power output which is provided by the battery can be determined in a manner which is dependent on the wiring protection and/or the peak power output. The peak power output of the battery can be used for a predefined time period which can lie in the range of seconds. After this time period, the power output of the battery drops as far as a continuous power output. The electronic computing device can receive a current power output release of the battery and/or a transition speed information item which characterizes the transition speed from a control unit, in particular via a CAN bus.

It is provided in a further possible refinement of the disclosure that the method is carried out during a journey of the hybrid vehicle. The power output release of the battery can change, in particular, during this journey of the hybrid vehicle, with the result that the characteristic diagram has to be determined again, and/or the characteristic diagram which is to be adapted has to be adapted in a manner which is dependent on the power output which is available for the electric traction machine. Carrying out the method during the journey of the hybrid vehicle can ensure that the characteristic diagram which is to be adapted is actually assigned to the power output which is available for the electric traction machine. As a result, the respective shift points can be determined with particularly great precision.

It is provided in a further possible refinement of the disclosure that, in the case of the respective curves in the characteristic diagram, the torque is plotted against a transmission output speed, and the automatic transmission is shifted on the basis of the transmission output speed. Here, for example, a wheel torque can be plotted as torque against the transmission output speed for the respective curves. By way of the torque being plotted against the respective transmission output speed, all the curves for the different gears can be superimposed on one another particularly simply, as a result of which the respective shift points can be determined particularly satisfactorily as points of intersection of the respective curves. A power output which results from the wheel torque and the transmission output speed is identical at the respective shift points for the adjacent gears, for the gears which are jointly assigned to this shift point and are therefore adjacent. In this way, the automatic transmission is shifted when the power output is identical for a current gear and the adjacent gear, into which a shift is to be carried out. As a result, shifting of the automatic transmission can take place in a manner which is neutral in terms of traction force. The shift points can be determined particularly simply and precisely by way of the torque being plotted against the transmission output speed in the case of the respective curves.

It is provided in a further possible refinement of the disclosure that the drag torque to be provided is determined in a manner which is dependent on a cut-off position of a piston of the internal combustion engine, and/or a temperature of the internal combustion engine, and/or a variable of the internal combustion engine. For this purpose, the electronic computing device can receive a drag torque requirement information item from an engine control unit, and can determine the drag torque to be provided in a manner which is dependent on this drag torque requirement information item. An 8-cylinder engine requires a greater drag torque than a 4-cylinder engine. The required drag torque is also greater at −10° C. than at a higher engine temperature, for example of 90° C. In particular, the required torque for cranking over the internal combustion engine is dependent on: the cut-off position of the piston of the internal combustion engine; the temperature of the internal combustion engine; and, the size of the internal combustion engine. During a journey of the motor vehicle, the piston can be moved into an optimum cut-off position, in order that as low a drag torque as possible is required for cranking over the internal combustion engine. Therefore, the drag torque to be provided can be determined with particularly great precision via a determination of the cut-off position of the piston of the internal combustion engine, and/or the temperature of the internal combustion engine, and/or the size of the internal combustion engine, as a result of which it can be ensured that the provided drag torque is sufficient for cranking over the internal combustion engine, if required. The size of the internal combustion engine is to be understood to mean, in particular, its displacement.

It is provided in a further possible refinement of the disclosure that, for a switchover between the electric traction machine and the internal combustion engine, the internal combustion engine is cranked over, in particular via the electric traction machine, and the internal combustion engine is subsequently accelerated by way of combustion of fuel. This means that the internal combustion engine accelerates independently after being cranked over.

As soon as the internal combustion engine runs synchronously with the electric machine, the electric traction machine can be disconnected from the drive train via a clutch and the internal combustion engine can be connected to the drive train. As a result, the drive of the hybrid vehicle can be transferred from the electric traction machine to the internal combustion engine. As an alternative, the internal combustion engine drive train and the electric drive train can be switched flexibly in the traction flow, the hybrid vehicle being driven in this mixed form by way of the two drives at the same time, and therefore both via the electric traction machine and via the internal combustion engine. Therefore, depending on the power requirement of the hybrid vehicle, the internal combustion engine drive train and the electric drive train can be connected to respective wheels of the hybrid vehicle. As an alternative, the electric traction machine can be integrated into the automatic transmission, and therefore cannot be capable of being decoupled from the automatic transmission. In this case, the internal combustion engine can be connected or disconnected via the clutch. The internal combustion engine can be connected, for example, according to the acceleration request, the storage content of the battery, or the driving mode.

It is provided in a further refinement of the disclosure that the adapted characteristic diagram and the resulting shift points are determined multiple times. In particular, the adapted characteristic diagram and the resulting shift points can be determined again at regular time intervals. This can ensure that the respective adapted characteristic diagram, on the basis of which the shifting logic is predefined, is adapted particularly satisfactorily to a current state of the hybrid vehicle and, as a result, the automatic transmission can be shifted in a manner which is particularly neutral in terms of traction force. Jolt-like shifting of the automatic transmission can therefore be at least substantially avoided.

The disclosure relates, furthermore, to an automatic transmission for a hybrid vehicle which is configured to be operated in a method, as has already been described in conjunction with the method according to the disclosure. The automatic transmission is therefore configured to be shifted at the respective predefined shift points using the shifting logic.

Furthermore, the disclosure relates to a hybrid vehicle, with an automatic transmission, as has already been described in conjunction with the automatic transmission according to the disclosure. Furthermore, the hybrid vehicle comprises an internal combustion engine and an electric traction machine. The electric traction machine is configured to provide a traction power output for the hybrid vehicle and to crank over the internal combustion engine. The electric traction machine can be part of the automatic transmission. The hybrid vehicle is a parallel hybrid. Advantages and advantageous developments of the method according to the disclosure are to be considered to be advantages and advantageous developments of the automatic transmission according to the disclosure and of the hybrid vehicle according to the disclosure, and vice versa.

Further features of the disclosure can result from the claims, the figures, and the description of the figures. The features and combinations of features which are mentioned above in the description, and the features and combination of features which are shown only in the following text in the description of the figures and/or in the figures, can be used not only in the respective specified combination, but rather, also in other combinations, or on their own, without departing from the scope of the disclosure.

BRIEF DESCRIPTION OF THE DRAWINGS

Identical and functionally identical elements are provided with identical designations in the figures.

DETAILED DESCRIPTION OF THE DRAWINGS

Figure 1:
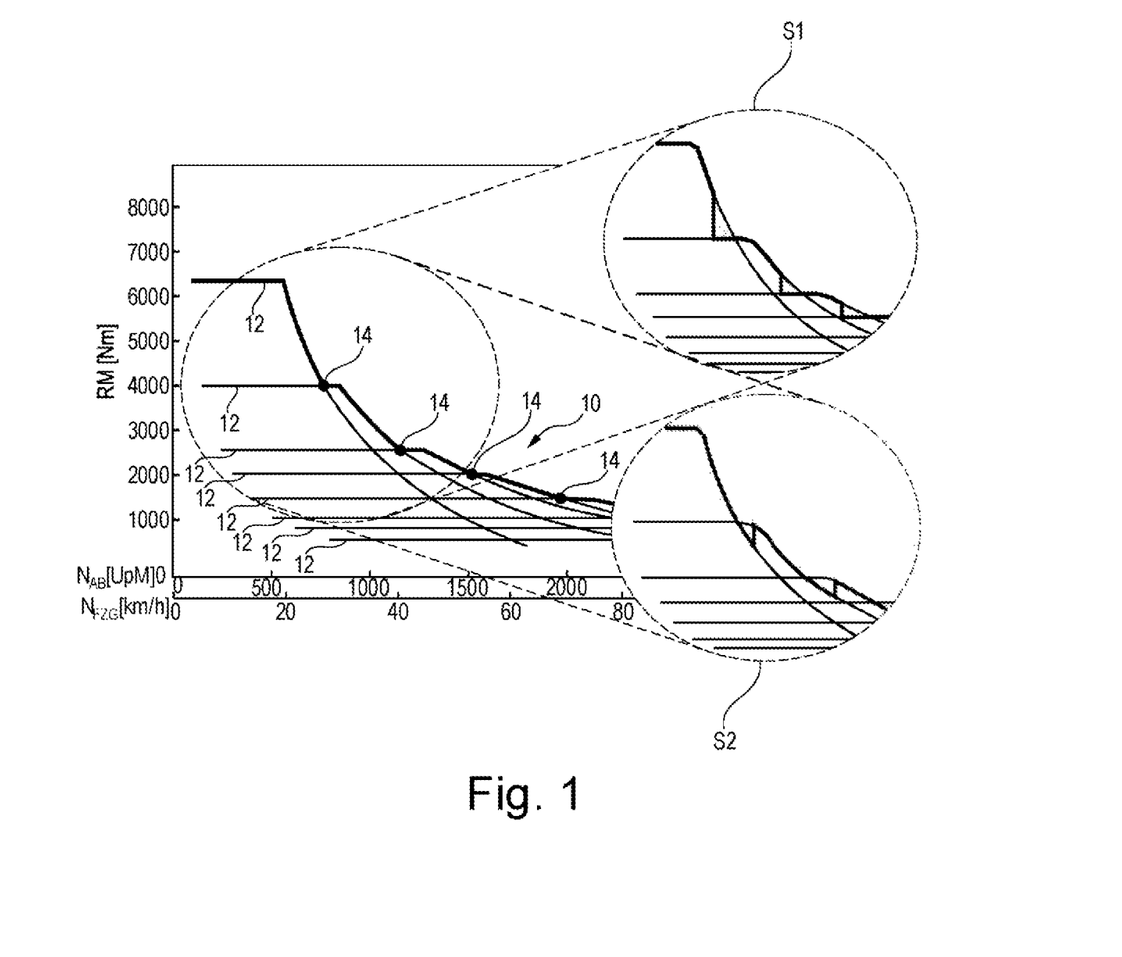
FIG. 1 shows a diagram for a shifting logic for an automatic transmission of a hybrid vehicle, with an adapted characteristic diagram which comprises respective curves for each gear of the automatic transmission, a wheel torque being plotted against a transmission output speed in the respective curves, and the shifting logic for the automatic transmission being predefined on the basis of the diagram, in which shifting logic respective shift points for shifting the automatic transmission at points of intersection of the curves of adjacent gears of the adapted characteristic diagram are fixed.

FIG. 1 shows an adapted characteristic diagram 10, on the basis of which a shifting logic for an automatic transmission of a hybrid vehicle can be predefined. This hybrid vehicle is configured, in particular, as what is known as a parallel hybrid, and has both an electric traction machine and an internal combustion engine. The electric traction machine is configured to provide a traction power output for the hybrid vehicle and to crank over the internal combustion engine. In order to ensure potential cranking over of the internal combustion engine via the electric traction machine, a drag torque 18 is provided at the electric traction machine. This drag torque 18 is required for potential cranking over of the internal combustion engine. The drag torque 18 which is to be provided is dependent on: a cut-off position of a piston of the internal combustion engine; a temperature of the internal combustion engine; and, a variable of the internal combustion engine. For a switchover between the electric traction machine and the internal combustion engine, it is provided that the internal combustion engine is cranked over via the electric traction machine and subsequently accelerates independently and therefore by way of combustion of fuel. As soon as the internal combustion engine runs synchronously with the electric traction machine, the internal combustion engine can be connected to the drive train via a clutch. Here, depending on the drive architecture/concept, the electric traction machine can be disconnected from the drive train via this clutch.

The adapted characteristic diagram 10 which is shown in FIG. 1 comprises a plurality of curves 12, in particular one curve 12 for each gear of the automatic transmission of the hybrid vehicle. Respective shift points 14 for the automatic transmission are fixed at respective points of intersection of curves 12 of adjacent gears. These shift points 14 are stored in a shifting logic for the automatic transmission, a best possible acceleration profile for shifting of the automatic transmission which is neutral in terms of traction force being predefined by way of these shift points 14. For the illustration of the adapted characteristic diagram 10 in FIG. 1, a wheel torque RM in Newton-meters for the first gear is plotted against a transmission output speed NAB in revolutions per minute, and against a vehicle speed $N_{FGZ}$ in kilometers per hour. On account of the cranking over of the internal combustion engine via the electric traction machine and without a starting device, there is merely a single shift point 14 for shifting which is neutral in terms of traction force for the automatic transmission, instead of a range for shifting which is neutral in terms of traction force for each shifting operation.

FIGS. 5a-d and 6a-d show the characteristic diagram 10 for respective different maximum power outputs which are available for the electric traction machine (FIGS. 5a-d), and for different drag torques which are to be provided in the electric traction machine (FIGS. 6a-d). The wheel torque RM is plotted in each case against the transmission output speed NAB both in the diagrams in FIGS. 5a-d and in the diagrams in FIGS. 6a-d. FIGS. 5a-d show the characteristic diagram 10 for a maximum available electric power output for driving the electric traction machine of 150 kW, of 130 KW, of 110 KW and of 90 KW with the respective curves 12 for the respective gears of the automatic transmission. The maximum available power output for the electric traction machine is dependent on an available power output which is provided by way of a battery of the hybrid vehicle for the electric traction machine. Here, the available power output which is provided by the battery for the electric traction machine is dependent on a charging state of the battery and a temperature of the battery. Furthermore, as an alternative, or in addition, the available power output which is provided by the battery can be dependent on its peak power output and/or wiring protection.

It can be seen in FIGS. 5a-d that the respective curves 12 of the characteristic diagram 10 shift toward smaller transmission output speeds in the case of a decreasing maximum available electrical power output for the electric traction machine. In particular, this can be seen by way of respective transition speeds 16 of the respective curves 12. In the case of a transmission output speed NAB below the transition speed 16 of the respective gear, a power output which can be provided by the electric traction machine is limited by way of a limit torque of the electric traction machine. In the case of transmission output speeds NAB which are greater than the respective transition speed 16 of the respective gear, the power output which can be provided by the electric traction machine is constant without the provision of cranking-over starting, and is dependent on the transmission output speed when cranking-over starting is provided. Up to the respective transition speed 16, the wheel torque is approximately constant, and a power output which the electric machine can provide for the hybrid vehicle as traction power output rises up to the transition speed 16, at which a maximum traction power output for the hybrid vehicle is provided by the electric traction machine. In particular, the traction power output rises in a linear manner until the transition speed 16 is reached. In the case of a transmission output speed above the transition speed 16, the wheel torque decreases, and the traction power output which is provided by the electric traction machine for the hybrid vehicle increases in a linear manner on account of the power output provision for cranking-over starting of the internal combustion engine. In particular, the power output provision for cranking-over starting of the internal combustion engine increases in a linear manner as the transmission input speed increases.

The lower the maximum available electrical power output which is provided for the electric traction machine, the lower the transition speed 16. The range, in which a maximum power output prevails in a gear, shifts toward smaller speeds and decreases. This results in different gears for an identical speed in a manner which is dependent on the maximum available electrical power output for the electric traction machine.

FIGS. 6*a-d* show the characteristic diagram 10 for different provisions of drag torque, in particular, for a provision of drag torque of 0 Newton-meters, of 50 Newton-meters, of 100 Newton-meters, and of 150 Newton-meters. As can be seen particularly well in FIGS. 6*a-d*, there is a range for shifting of the automatic transmission which is neutral in terms of traction force in respective adjacent gears for a provision of drag torque of 0 Newton-meters. The higher the drag torque 18 which is to be provided, the further the respective curves 12 of the characteristic diagram 10 shift toward smaller torques, in particular wheel torques RM. As can be seen in FIGS. 6*a-d*, the respective curves 12 of the characteristic diagram 10 are shifted with an increasing drag torque 18 to be provided, in such a way that the respective wheel torques, which are available for driving, of the respective curves 12 are shifted downward. Here, the respective transition speeds 16 remain identical, a target speed and therefore the respective shift point 14 decreasing with an increasing drag torque 18 to be provided. In the case of transmission output speeds NAB which are greater than the respective transition speed 16 of the respective gear with a provision of drag torque, the power output which can be provided by the electric traction machine is dependent on the transmission input speed. Therefore, the power output for driving reduces while the provision of power output for cranking-over starting rises. A sum of the power output available for driving and the provision of the power output remains identical, however, for example, 130 kW.

For the determination of the characteristic diagram 10, therefore, the maximum available electrical power output for driving the electric traction machine is determined, and the characteristic diagram is produced, in a manner which is dependent on this determined maximum available electrical power output for the electric traction machine. This characteristic diagram is adapted in a manner which is dependent on the drag torque 18 to be provided, by each curve 12 being reduced by the drag torque 18 to be provided. Subsequently, the shifting logic is predefined, in which respective shift points 14 for shifting the automatic transmission are fixed at points of intersection of the curves 12 of adjacent gears of the adapted characteristic diagram 10. For shifting of the automatic transmission which is neutral in terms of traction force, the automatic transmission is shifted at the respective shift points 14 using the shifting logic. In particular, the automatic transmission is shifted on the basis of the transmission output speed NAB.

Since an electrical power output which is available for the electric traction machine can change during a journey of the hybrid vehicle (in particular, on account of a protective function of the battery, and/or a strategic power output reduction of the battery, in particular in order to avoid excessively rapid ageing of a high voltage store of the battery, or for component protection), and the drag torque 18 to be provided can additionally change during the journey of the hybrid vehicle (in particular, on account of the temperature change of the internal combustion engine and/or a change in a cut-off position of the piston of the internal combustion engine), it can be provided that a method for operating the automatic transmission of the hybrid vehicle (in the case of which method the characteristic diagram 10 is produced and adapted and the switching logic is subsequently predefined), is carried out during a journey of the hybrid vehicle. In particular, the adapted characteristic diagram 10 and the resulting shift points 14 are determined multiple times and therefore repeatedly, in particular at regular time intervals, in order to make shifting of the automatic transmission which is particularly neutral in terms of traction force possible at any time.

Figure 2:
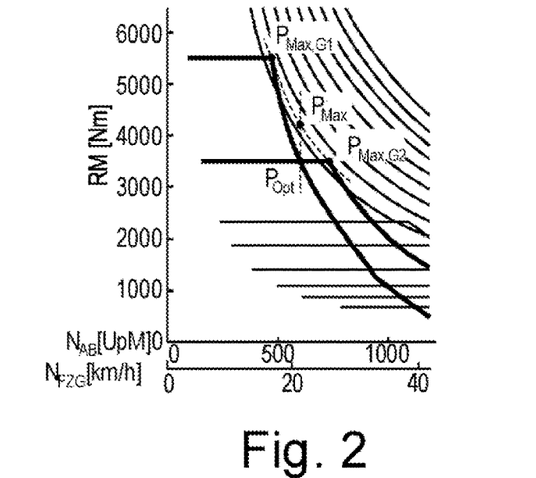
FIG. 2 shows a detail of the characteristic diagram according to FIG. 1, a maximum power output of the electric traction machine at a transition speed of the first gear and a maximum power output of the electric traction machine at a transition speed of the second gear, a power-optimum shift point and a maximum power output of the electric traction machine at the optimum shift point, without cranking-over starting being provided being marked.

In the following text, a calculation of a target speed with a provision of torque for cranking-over starting will be explained by way of example, the respective points being shown in the graph in FIG. 2, in which the wheel torque RM in Newton-meters for the first gear is plotted against the transmission output speed NAB in revolutions per minute, and against the vehicle speed $N_{FGZ}$ in kilometers per hour.

$p_{Max,G1}$=maximum power output at the transition speed from the first gear $p_{Max,G2}$=maximum power output at the transition speed from the second gear $P_{opt}$=optimum (power output) shift point $P_{Max}$=max. power output at the optimum shift point (without provision of cranking-over starting)

$P_{Schlepp}$=provision of power output for cranking-over starting $$P_{Opt} = P_{Max} - P_{Schleppstart} \qquad (i)$$

$$P_{Max,G1} = m_{Eck,G1} \cdot \frac{n_{Eck,G1}}{9550} \qquad (ii)$$

$$P_{Schlepp} = m_{Schlepp} \cdot \frac{n_{opt} - n_{Eck,G1}}{9550} \qquad (iii)$$

$$m_{Opt} = \frac{m_{Eck,G1}}{i_{Gang}} \qquad (iv)$$

$$P_{Opt} = m_{Opt} \cdot \frac{n_{Opt}}{9550} \qquad (v)$$

$$P_{Max,G1} = P_{Max} = P_{Max,G2} \qquad (vi)$$

$$P_{Opt} = P_{Max} - P_{Schleppstart}$$

$$m_{Opt} \cdot n_{Opt} = m_{Eck,G1} \cdot n_{Eck,G1} - m_{Schlepp} \cdot (n_{Opt} - n_{Eck,G1})$$

$$\frac{m_{Eck,G1}}{i_{Gang}} \cdot n_{Opt} = m_{Eck,G1} \cdot n_{Eck,G1} - m_{Schlepp} \cdot n_{Opt} + m_{Schlepp} \cdot n_{Eck,G1}$$

$$\left(\frac{m_{Eck,G1}}{i_{Gang}} + m_{Schlepp}\right) \cdot n_{Opt} = (m_{Eck,G1} + m_{Schlepp}) \cdot n_{Eck,G1}$$

$$n_{Opt} = \frac{(m_{Eck,G1} + m_{Schlepp}) \cdot n_{Eck,G1}}{\frac{m_{Eck,G1}}{i_{Gang}} + m_{Schlepp}}$$

Example for 130 kW available power output (all torques and speeds relate to the first gear):

$$n_{Eck,G1} = 2759 \; rpm$$

$$m_{Schlepp} = 100 \; Nm$$

$$m_{Eck,G1} = 350 \; Nm$$

$$n_{Opt} = \frac{(350 \; Nm + 100 \; Nm) \cdot 2759 \; rpm}{\frac{350 \; Nm}{1,562} + 100 \; Nm} = 3831 \; rpm$$

FIG. 1 shows a first situation S1, in which an excessively early upshift is shown. Furthermore, FIG. 1 shows a second situation S2, in which an excessively late upshift is shown. This excessively late upshift in the second situation S2 and the excessively early upshift in the first situation S1 are in contrast to the shift of the automatic transmission which is neutral in terms of traction force and is predefined by the ideal shift points 14.

Figure 3:
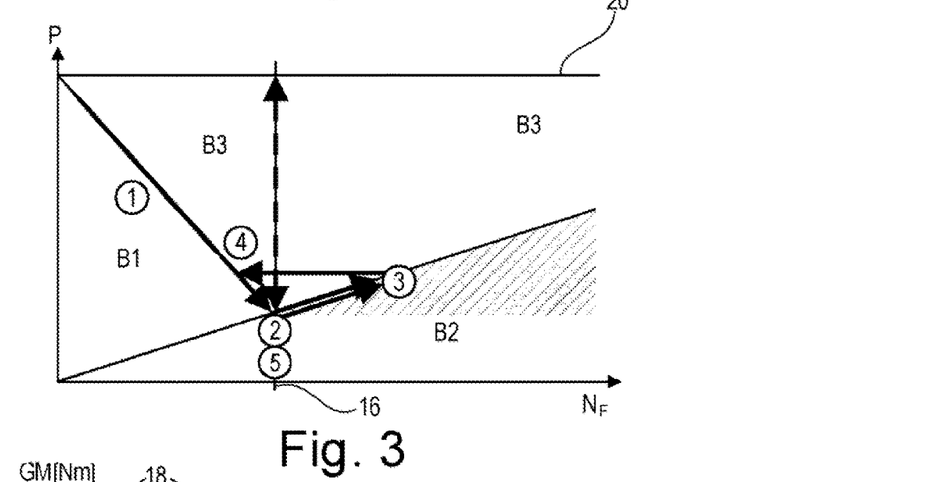
FIG. 3 shows a diagram, in which a power output of the electric traction machine is shown plotted against a transmission input speed, a maximum power output for a driver's request of the electric traction machine being available at a transition speed.
Figure 4:
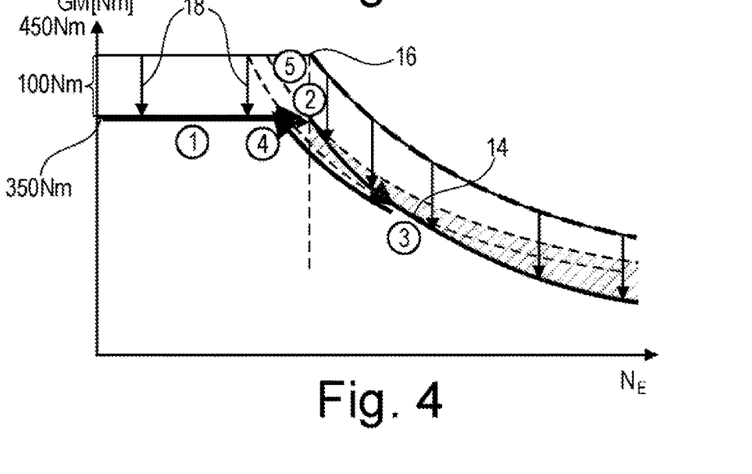
FIG. 4 shows a diagrammatic graph, in which a transmission input torque is plotted against a transmission input speed, a shifting operation being shown jointly in FIGS. 3 and 4.
Figure 5A:
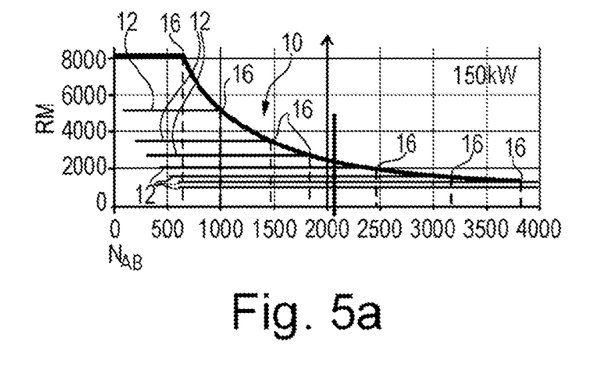
FIGS. 5a-d show the characteristic diagram for different power outputs which are available as a maximum for driving the electric traction machine, it being possible to see that the lower the electric power output which is available for the electric traction machine, the further the respective curves of the characteristic diagram shift toward smaller transition output speeds.
Figure 5B:
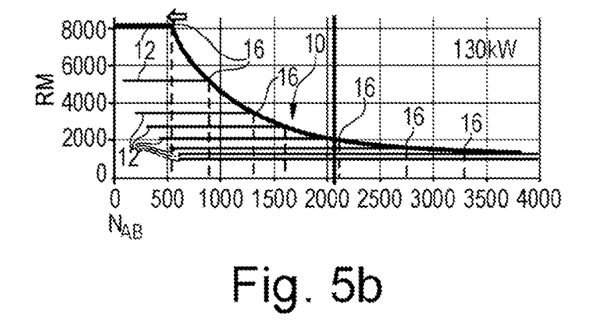
Figure 5C:
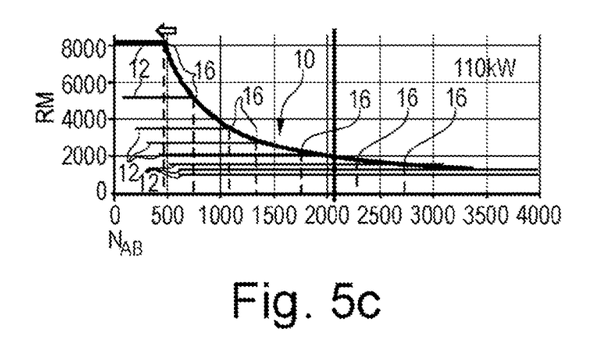
Figure 5D:
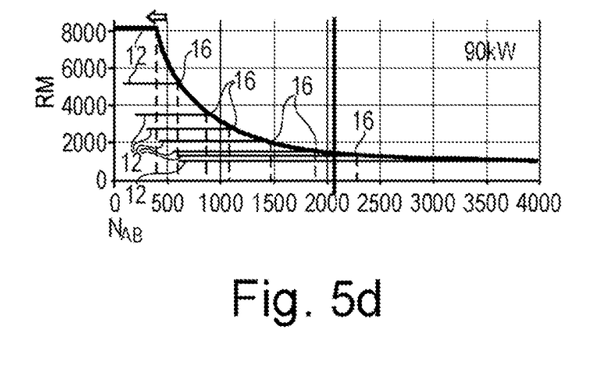
Figure 6A:
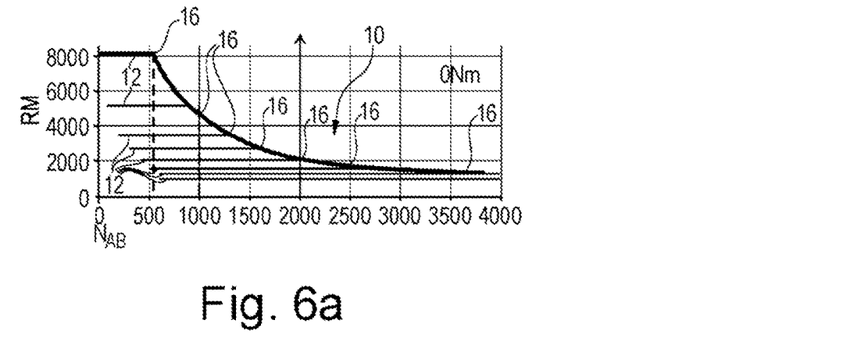
FIGS. 6a-d show a characteristic diagram which is produced for a power output of 130 KW which is available as a maximum for the electric traction machine, and respective characteristic diagrams which are adapted in a manner which is dependent on drag torques which are to be provided for driving an internal combustion engine, it being possible to see that the greater the drag torque which is to be provided, the more the respective curves of the characteristic diagram shift toward smaller wheel torques.
Figure 6B:
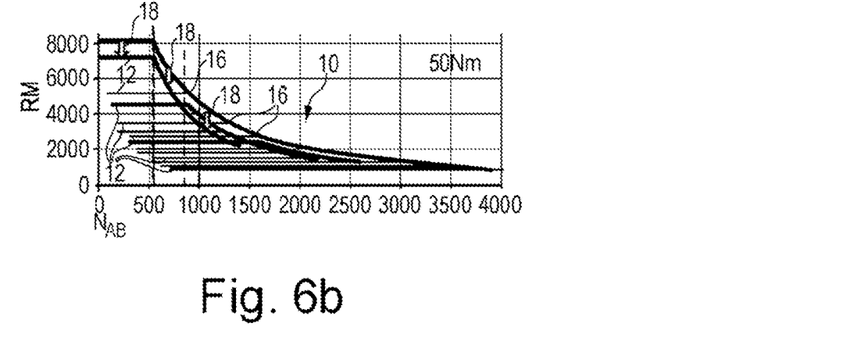
Figure 6C:
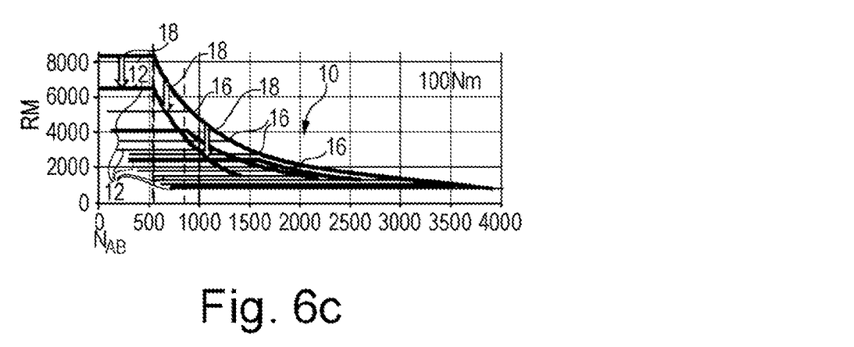
Figure 6D:
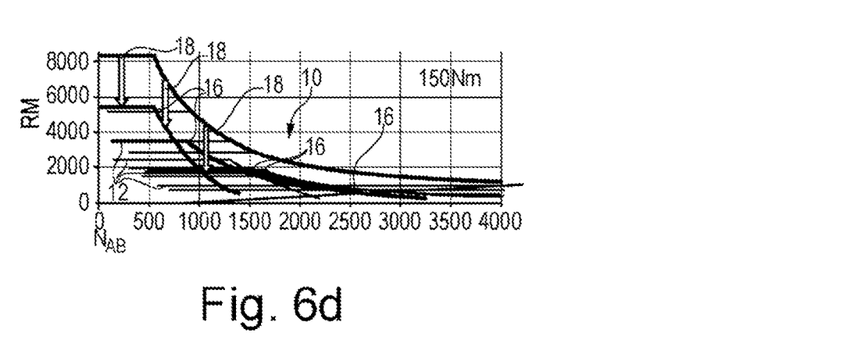

FIGS. 3 and 4 show a shifting operation from a first gear into a second gear of the automatic transmission. Here, a power output P is plotted against a transmission input speed NE in FIG. 3. In FIG. 4, for a limit torque of 450 Newton-meters and a maximum electrical power output of 130 KW which is available for the electric traction machine at a provision of drag torque of 100 Newton-meters, a transmission input torque GM in Newton-meters is plotted against the transmission input speed NE. This results in a torque of 350 Newton-meters which remains for the driver's request, which in turn results in a maximum power output of 101 kW at the transition speed 16.

Different ranges result in FIG. 3. A first (power output) range B1 cannot be moved to on account of a torque limitation of the electric traction machine. The electric traction machine can make a power output provided by the battery available only from the transition speed 16. A second range B2 describes the provision of power output of the electric traction machine for cranking over the internal combustion engine, the provision of power output increasing in a linear manner with a rising rotational speed. The power output which can be moved to is shown for the hybrid vehicle in a third range B3. This power output which can be moved to is limited by a maximum power output release 20. As can be seen in the third range B3, a maximum power output for a driver request prevails at the transition speed 16.

FIGS. 3 and 4 show the shifting operation of the automatic transmission from the first gear into the second gear, the automatic transmission being set in the first gear in a first step 1, and the transmission input speed being increased as far as the transition speed 16. Here, a power output which can be utilized for acceleration is limited by a maximum torque which can be provided by the electric traction machine, in the present case 350 Newton-meters. In a second step 2 of the method, the transmission input speed corresponds to the transition speed 16, as a result of which the power output which is available for acceleration corresponds to a power output optimum. The transmission input speed is subsequently increased further until, in a third step 3, the automatic transmission is shifted from the first gear into the second gear. In a fourth step 4 of the method, the second gear is engaged in the automatic transmission, a power output which can be utilized in the current and in the next higher gear, in the present case the first gear and the second gear, being identical in the third step 3 and in the fourth step 4. In particular, in the third step 3, the automatic transmission is shifted at one of the predefined shift points 14 of the shifting logic. If this shift point 14 is exceeded, the power output which is available for driving undershoots the power output in the next higher gear. This is due to the fact that the provision of power output at the higher transmission input speed is higher than the power output deficit on account of the torque limitation in the present case to 350 Newton-meters in the next higher gear. In the fourth step 4, the rotational speed at the transmission input is subsequently increased further until, in the fifth step 5, the transition speed 16 for the second gear is reached. In the case of this transition speed 16, the maximum power output of the electric traction machine is available for the second gear as traction power output for the hybrid vehicle.

For each further shift of the automatic transmission, the sequence is repeated in accordance with the same principle. In the case of a shift of the automatic transmission, the respective gears are fully utilized such that the following speed in the next gear corresponds to the transition speed 16 and/or lies slightly below the transition speed 16 in a manner which is dependent on the cranking-over power output to be provided, as can be seen in the figures in step 4.

Overall, the disclosure shows how a calculation of optimum-power shift points 14 can take place in the electric method with consideration of the provision of power output for cranking-over starting.

LIST OF DESIGNATIONS

10 Characteristic diagram
12 Curve
14 Shift point
16 Transition speed
18 Drag torque
20 Maximum power output release
B1 to B3 Respective ranges
1 to 5 Respective steps of a method
S1, S2 Respective situations
RM Wheel torque
NAB Transmission output speed
$N_{FGZ}$ Vehicle speed
GM Transmission input torque
NE Transmission input speed
P Power output

The invention claimed is:

1. A method for operating an automatic transmission of a hybrid vehicle which has an electric traction machine and an internal combustion engine, the electric traction machine being configured to provide traction power output for the hybrid vehicle and to crank over the internal combustion engine, wherein a drag torque provided at the electric traction machine is required to crank over the internal combustion engine, the method comprising:
  producing a characteristic diagram for the electric traction machine, starting from a maximum available electrical power output for driving the electric traction machine, with respective curves for respective gears of the automatic transmission of the hybrid vehicle, the curves formed by plotting a torque against a rotational speed, and the characteristic diagram being adapted in a manner which is dependent on the drag torque to be provided, by each curve being reduced by the drag torque to be provided; and,
  predefining a shifting logic, in which respective shift points for shifting the automatic transmission are defined at points of intersection of the curves of adjacent gears of the adapted characteristic diagram; and,
  shifting the automatic transmission at the respective shift points using the shifting logic.

2. The method according to claim 1, wherein:
  the maximum available power output for the electric traction machine is determined in a manner which is dependent on an available power output which is provided by way of a battery.

3. The method according to claim 2, wherein:
  the available power output which is provided by the battery is determined in a manner which is dependent on a charging state of the battery and/or a temperature of the battery.

4. The method according to claim 1, wherein:
  the method is carried out during a journey of the hybrid vehicle.

5. The method according to claim 1, wherein:
  in the case of the respective curves in the characteristic diagram, the torque is plotted against a transmission output speed, and the automatic transmission is shifted on the basis of the transmission output speed.

6. The method according to claim 1, wherein:
the drag torque to be provided is determined in a manner which is dependent on a cut-off position of a piston of the internal combustion engine.

7. The method according to claim 1, wherein:
the drag torque to be provided is determined in a manner which is dependent on a temperature of the internal combustion engine.

8. The method according to claim 1, wherein:
the drag torque to be provided is determined in a manner which is dependent on a variable of the internal combustion engine.

9. The method according to claim 1, wherein:
for a switchover between the electric traction machine and the internal combustion engine, the internal combustion engine is cranked over and is subsequently accelerated by way of combustion of fuel, and, as soon as the internal combustion engine runs synchronously with the electric traction machine, the internal combustion engine is connected to the drive train.

10. The method according to claim 1, wherein:
the adapted characteristic diagram and the resulting shift points are determined multiple times.

11. An automatic transmission for a hybrid vehicle which is configured to be operated in a method according to claim 1.

12. A hybrid vehicle, with an automatic transmission according to claim 11, an internal combustion engine, and an electric traction machine.

* * * * *